(12) United States Patent
Westberg et al.

(10) Patent No.: US 12,428,081 B2
(45) Date of Patent: Sep. 30, 2025

(54) GROUND ENGAGING DEVICE FOR AN ENDLESS TRACK OF A TRACKED VEHICLE

(71) Applicant: Bae Systems Hägglunds Aktiebolag, Örnsköldsvik (SE)

(72) Inventors: Björn Westberg, Arnäsvall (SE); Håkan Köhn, Arnäsvall (SE); Philip Kortz, Örnsköldsvik (SE)

(73) Assignee: Bae Systems Hägglunds Aktiebolag, Omsköldsvik (SE)

( * ) Notice: Subject to any disclaimer, the term of this patent is extended or adjusted under 35 U.S.C. 154(b) by 562 days.

(21) Appl. No.: 17/796,729

(22) PCT Filed: Jan. 25, 2021

(86) PCT No.: PCT/SE2021/050043
§ 371 (c)(1),
(2) Date: Aug. 1, 2022

(87) PCT Pub. No.: WO2021/158157
PCT Pub. Date: Aug. 12, 2021

(65) Prior Publication Data
US 2023/0067704 A1    Mar. 2, 2023

(30) Foreign Application Priority Data
Feb. 6, 2020 (SE) .................................. 2050130-0

(51) Int. Cl.
*B62D 55/28* (2006.01)
(52) U.S. Cl.
CPC ......... *B62D 55/286* (2013.01); *B62D 55/283* (2013.01); *B60Y 2200/25* (2013.01)
(58) Field of Classification Search
CPC ...... B62D 55/26; B62D 55/28; B62D 55/283; B62D 55/286; B60Y 2200/25
(Continued)

(56) References Cited

U.S. PATENT DOCUMENTS 1,113,344 A * 10/1914 Hodges ................. F16B 39/108
411/123
1,437,693 A * 12/1922 Torrensen ............ B62D 55/283
305/117
(Continued)

FOREIGN PATENT DOCUMENTS

AT          12423 U1 *  3/2012  ............. B62D 55/20
CH        224100 A  *  1/1943  ........... B62D 55/283
(Continued)

OTHER PUBLICATIONS

European Search Report and Opinion for European Application No. 21750096.6 mailed on Jan. 25, 2024, 9 pages.
(Continued)

*Primary Examiner* — S. Joseph Morano
*Assistant Examiner* — Eva L Comino
(74) *Attorney, Agent, or Firm* — Morrison & Foerster LLP

(57) ABSTRACT

The present invention relates to a ground engaging device (G) for an endless track (E) of a tracked vehicle. The ground engaging device is attachable to the outer side of said endless track (E). The ground engaging device (G) comprises an engagement member (10) configured to be arranged in connection to the outer side (Ea) of the endless track (E). The ground engaging device (G) further comprises a fastening arrangement (A) for attaching the ground engaging device (G) to the endless track (E) so that the engagement member (10) is positioned in connection the outer side (Ea) of the endless track (E). The fastening arrangement (A) comprises a adjustment device (D) configured to allow self adjustment of the position of said engagement member relative to the endless track (E) based on pressure against the engagement member (10) towards the endless track (E). The present invention also relates to a tracked vehicle.

14 Claims, 4 Drawing Sheets

(58) Field of Classification Search
USPC .......................................................... 305/180
See application file for complete search history.

(56) References Cited

U.S. PATENT DOCUMENTS

| | | | | |
|---|---|---|---|---|
| 3,967,875 A | * | 7/1976 | Stanaitis | H01R 4/34 |
| | | | | 411/959 |
| 6,557,954 B1 | * | 5/2003 | Hattori | B62D 55/275 |
| | | | | 305/51 |
| 10,071,303 B2 | * | 9/2018 | Pikulski | A63C 17/262 |
| 2013/0049452 A1 | | 2/2013 | Burling | |
| 2018/0127037 A1 | | 5/2018 | Lafreniere et al. | |
| 2018/0319450 A1 | | 11/2018 | Wilson et al. | |

FOREIGN PATENT DOCUMENTS

| | | | | |
|---|---|---|---|---|
| DE | 609895 C | | 2/1935 | |
| GB | 190219502 A | * | 9/1903 | ........... B62D 55/283 |
| GB | 20245 | | 7/1915 | |
| GB | 304593 A | | 7/1929 | |
| GB | 538499 A | * | 8/1941 | ........... B62D 55/283 |
| JP | H08282559 A | * | 10/1996 | ........... B62D 55/275 |
| JP | 2000233777 A | | 8/2000 | |
| JP | 2002264855 A | | 9/2002 | |
| WO | WO-2019016430 A1 | * | 1/2019 | ............. B62D 55/04 |
| WO | WO-2020101508 A1 | * | 5/2020 | ............. B62D 55/28 |

OTHER PUBLICATIONS

International Search Report and Written Opinion for International Application No. PCT/SE2021/050043 mailed on Feb. 23, 2021, 14 pages.

Swedish Office Action and Search Report for Swedish Application No. SE2050130-0 mailed on Sep. 15, 2020, 9 pages.

* cited by examiner

GROUND ENGAGING DEVICE FOR AN ENDLESS TRACK OF A TRACKED VEHICLE

CROSS REFERENCE TO RELATED APPLICATIONS

This application is a national stage application under 35 U.S.C. § 371 of International Application No. PCT/SE2021/050043, filed internationally on Jan. 25, 2021, which claims priority to SE 2050130-0, filed Feb. 6, 2020, the entire contents of each are incorporated by reference herein.

TECHNICAL FIELD

The present invention relates to a ground engaging device for an endless track of a tracked vehicle. The present invention also relates to a tracked vehicle with endless track comprising such a ground engaging device.

BACKGROUND

Tracked vehicles are equipped with assemblies comprising an endless track arranged to run over a set of wheels.

In order to improve grip on the surface on ground conditions such as ice and snow, the tracked vehicle may be equipped with some kind of ground engaging device arranged on the outer side of the endless track. Over time there may be certain disengagement of the attached ground engaging device relative to the endless track, which may result in damages on ground engaging device and/or endless track.

There is a need for providing ground engaging device which facilitates reducing the risk of damages on the ground engaging device and/or endless track during drive of a tracked vehicle having such ground engaging device attached to the endless track.

OBJECTS OF THE INVENTION

An object of the present invention is to provide a ground engaging device for an endless track of a tracked vehicle, which facilitates reducing the risk of damages on the ground engaging device and/or endless track during drive of a tracked vehicle having such ground engaging device attached to the endless track.

A further object of the present invention is to provide a tracked vehicle comprising such a ground engaging device.

SUMMARY

These and other objects, apparent from the following description, are achieved by a ground engaging device and a tracked vehicle, as set out in the appended independent claims. Preferred embodiments of the ground engaging device are defined in appended dependent claims.

According to the invention the objects are achieved by a ground engaging device for an endless track of a tracked vehicle, the ground engaging device being attachable to the outer side of said endless track, the ground engaging device comprising an engagement member configured to be arranged in connection to the outer side of the endless track, and a fastening arrangement for attaching the ground engaging device to the endless track so that the engagement member is positioned in connection to the outer side of the endless track, wherein the fastening arrangement comprises an adjustment device configured to allow self adjustment of the position of said engagement member relative to the endless track based on pressure against the engagement member towards the endless track.

Hereby disengagement of a ground engaging device attached on the outer side of an endless track may be efficiently avoided in that the tension with which the ground engaging device is attached is self adjusted, thus facilitating reducing the risk of damages on the ground engaging device and/or endless track during drive of a tracked vehicle having such ground engaging device attached to the endless track. By thus providing an adjustment device configured to allow self adjustment of the position of said engagement member relative to the endless track based on pressure against the engagement member towards the endless track, movement of said engagement member in the direction towards said endless track is provided, facilitating increased tensioning by the fastening arrangement. Such increased tensioning by the fastening arrangement by means of said movement of said engagement member in the direction towards said endless track may be configured to be maintained by means of said self adjustment device.

According to an embodiment of the ground engaging device, the adjustment device is configured to allow self adjustment of the tension with which the ground engaging device is attached to the endless track.

According to an embodiment of the ground engaging device, the adjustment device is configured to allow movement of the engagement member in the direction towards the endless track so that the tension provided by the fastening arrangement is increased, and wherein the adjustment device is configured to prevent movement in the opposite direction. Hereby disengagement of a ground engaging device attached on the outer side of an endless track may be efficiently avoided in that the engagement member is pressed towards the endless track so that distance there between is avoided/reduced and so that it is prevented to be moved away from the endless track. This thus facilitates reducing the risk of damages on the ground engaging device and/or endless track during drive of a tracked vehicle having such ground engaging device attached to the endless track.

According to an embodiment of the ground engaging device, the adjustment device comprises a teeth locking configuration configured to allow movement of the engagement member in the direction towards the endless track, and configured to provide a locking function so as to prevent movement in the opposite direction. By thus using a teeth locking configuration, movement of the engagement member in the direction towards the endless track and locking in the opposite direction may be efficiently obtained.

According to an embodiment of the ground engaging device, the teeth locking configuration comprises a set of teeth with an inclination so as to allow stepwise movement of the engagement member in the direction towards the endless track, and provide said locking function in the opposite direction. By thus using a teeth locking configuration with a set of teeth, stepwise movement of the engagement member in the direction towards the endless track and locking in the opposite direction may be efficiently obtained. The length/distance of the steps with which the tension may be adjusted is determined based on the dividing distance between the teeth.

According to an embodiment of the ground engaging device, said fastening arrangement comprises opposite side members for fastening the ground engaging device on the respective side of the endless track, the ground engaging member being arranged between the side members, wherein the side members are configured to support said ground engaging member, the adjustment device being associated with the respective side member. Hereby is obtained a ground engaging device which is easy to attach and which facilitates easy adjustment of the tension with which the ground engaging device is attached. According to an aspect of the present disclosure, the adjustment device is arranged in and in connection to the respective side member. According to an aspect of the present disclosure, the respective side member comprises and/or are provided with the adjustment device. The opposite side members comprises a first side member and an opposite second side member. According to an aspect of the present disclosure, the adjustment device comprises a first tension adjustment configuration associated with the first side member and a second adjustment configuration associated with the second side member.

According to an embodiment of the ground engaging device, the respective side member comprises an elongated opening extending in a direction essentially orthogonal to the extension of the ground engaging member, said fastening arrangement comprising a fastening joint member configured to be introduced into the respective elongated opening, said elongated openings facilitating movement of the side members and hence ground engaging member relative to said fastening joint members. Hereby control of movement of the ground engaging member towards the endless track is facilitated.

According to an embodiment of the ground engaging device, for the respective side member, said teeth locking configuration is arranged in connection to the elongated opening. Hereby control of movement of the ground member engaging towards the endless track and locking in the opposite direction is facilitated.

According to an embodiment of the ground engaging device, said fastening arrangement comprises opposite side members for fastening the ground engaging device on the respective side of the endless track, the ground engaging member being arranged between the side members, wherein the side members are configured to support said ground engaging member, the adjustment device being associated with the respective side member, wherein the respective side member comprises an elongated opening extending in a direction essentially orthogonal to the extension of the ground engaging member, said fastening arrangement comprising a fastening joint member configured to be introduced into the respective elongated opening, said elongated openings facilitating movement of the side members and hence ground engaging member relative to said fastening joint members, wherein, for the respective side member, said teeth locking configuration is arranged in connection to the elongated opening. By thus having said teeth locking configuration arranged in connection to the elongated opening of the respective side member, control of movement of the ground engaging member towards the endless track and locking in the opposite direction is facilitated.

According to an embodiment of the ground engaging device, the respective side member has an outer side configured to face away from the endless track and an opposite inner side configured to face towards the endless track, wherein said teeth locking configuration comprises one or more teeth arranged on at least one side of the respective side member. Hereby control of movement of the ground engaging member towards the endless track and locking in the opposite direction is facilitated.

According to an embodiment of the ground engaging device, the respective side member comprises a recess arranged on one side of the side member in connection to the elongated opening, wherein, for the respective side member, one or more teeth of said teeth locking configuration are arranged in the bottom of said recess. Hereby control of movement of the ground engaging member towards the endless track and locking in the opposite direction is facilitated.

According to an embodiment of the ground engaging device, said fastening arrangement comprises, for the respective side member, a washer element configured to distribute the load of the fastening joint member, wherein said teeth locking configuration comprises one or more teeth arranged on the washer element and configured to engage with the one or more teeth of the side member. Hereby easy and efficient adjustment of the tension with which the ground engaging device is attached is facilitated.

According to an embodiment of the ground engaging device, said washer element, for the respective side member, is configured to be closely received within said recess so as to maintain said one or more teeth of the washer element aligned with the one or more teeth of the side member. Hereby efficient control of movement of the washer element and efficient positioning of the washer element is facilitated, efficiently reducing the risk of the washer element turning and thereby the risk of the one or more teeth of the washer element not engaging with the one or more teeth of the side member due to said teeth not aligning. Said recess may comprise opposite sides running essentially orthogonal to the extension of the one or more teeth on the bottom of said recess, wherein the washer element is arranged within said recess such that the washer element extends so that opposite sides of the washer element are close to said opposite sides of the recess, essentially preventing turning of the washer element but allowing the washer element to move relative to the elongated opening.

According to an embodiment of the ground engaging device, said ground engaging device is configured to provide increased ground engagement so as to improve traction of the tracked vehicle on ground conditions such as ice and snow.

According to an embodiment of the ground engaging device, the ground engaging device is removably attachable to an endless track of a track assembly of a tracked vehicle. Hereby the ground engaging device may removed from the endless track when not needed.

According to the invention the objects are achieved by a tracked vehicle comprising at least one ground engaging device as set out herein.

DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Herein the term "rubber" in relation to "rubber track" refers to any elastic material such as rubber, elastomers or combinations of rubber and elastomers.

Such a tracked vehicle may comprise a right track assembly and a left track assembly for driving the vehicle. Each track assembly may comprise a drive wheel, a tension wheel, a set of road wheels and an endless track arranged to run over said wheels. Said endless track of the respective track assembly is configured to run around said wheels. The endless track of the respective track assembly may be arranged to be driven and hence rotated by means of said drive wheel. The tracked vehicle may comprise drive means for driving said drive wheels. The drive means may be any suitable drive means such as one or more internal combustion engines and/or one or more electric machines.

The endless track of the respective track assembly may have any suitable configuration and be of any suitable material. The endless track of the respective track assembly may according to an aspect of the present disclosure be a rubber track. The endless track of the respective track assembly may according to an aspect of the present disclosure be a steel track.

Figure 1:
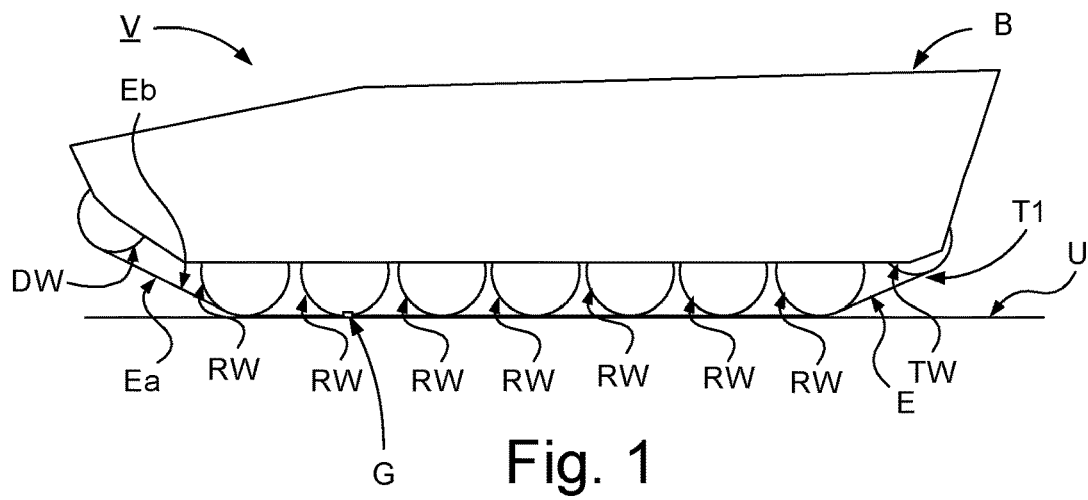
FIG. 1 schematically illustrates a side view of a tracked vehicle according to an embodiment of the present disclosure.

FIG. 1 schematically illustrates a side view of a tracked vehicle V according to an embodiment of the present disclosure. The vehicle is standing/driving on a ground U.

The tracked vehicle V is according to the disclosure in FIG. 1 a military vehicle.

The tracked vehicle V comprises a vehicle body B, which according to an aspect of the present disclosure comprises the chassis of the vehicle V and bodywork.

The tracked vehicle V comprises a left track assembly T1 and a right track assembly for driving the vehicle V, the left track assembly being shown in FIG. 1. Each track assembly comprises a drive wheel DW, a tension wheel TW, a set of road wheels RW and an endless track E arranged to run over said wheels. Here the drive wheel DW is arranged in the front, the tension wheel TW is arranged in the back and the road wheels RW are arranged between the drive wheel DW and the tension wheel TW. The tracked vehicle according to the present disclosure may however have track assemblies with any suitable arrangement of drive wheel, tension wheel and road wheels. According to an aspect of the present disclosure the tension wheel may be arranged in the front, the drive wheel arranged in the back and the road wheels arranged there between.

The endless track E of the respective track assembly is arranged to be driven and hence rotated by means of said drive wheel DW. The tracked vehicle V comprises a drive means, not shown, for driving said drive wheels DW. The drive means may be any suitable drive means such as an internal combustion engine and/or an electric machine. The endless track E of the tracked vehicle has an outer side Ea, a portion of said outer side Ea being configured face the ground U, the portion of the outer side Ea of the endless track E facing the ground changing during drive of the tracked vehicle V involving rotation of the endless track E. The endless track E of the tracked vehicle has an inner side Eb opposite to said outer side Ea, said inner side being configured to face the wheels DW, RW, TW of the track assembly.

The endless track of the respective track assembly may have any suitable configuration and be of any suitable material. The endless track E of the respective track assembly is according to an aspect of the present disclosure a rubber track. The endless track of the respective track assembly may according to an aspect of the present disclosure be a steel track.

The plurality of road wheels RW are configured to be suspendedly connected to the vehicle body B. The plurality of road wheels RW are configured to provide a pressure against the portion of the endless track E being in contact with the ground, the pressure being associated with the weight of the body of the tracked vehicle V.

The tracked vehicle V may be provided with a set of the ground engaging devices G attached on the outer side Ea of said endless track E and distributed with a certain distance along the outer side Ea of the endless track E, one ground engaging device G being schematically illustrated in FIG. 1. The ground engaging device G according to the present disclosure is described in more detail below with reference to FIG. 2-7.

Figure 2:
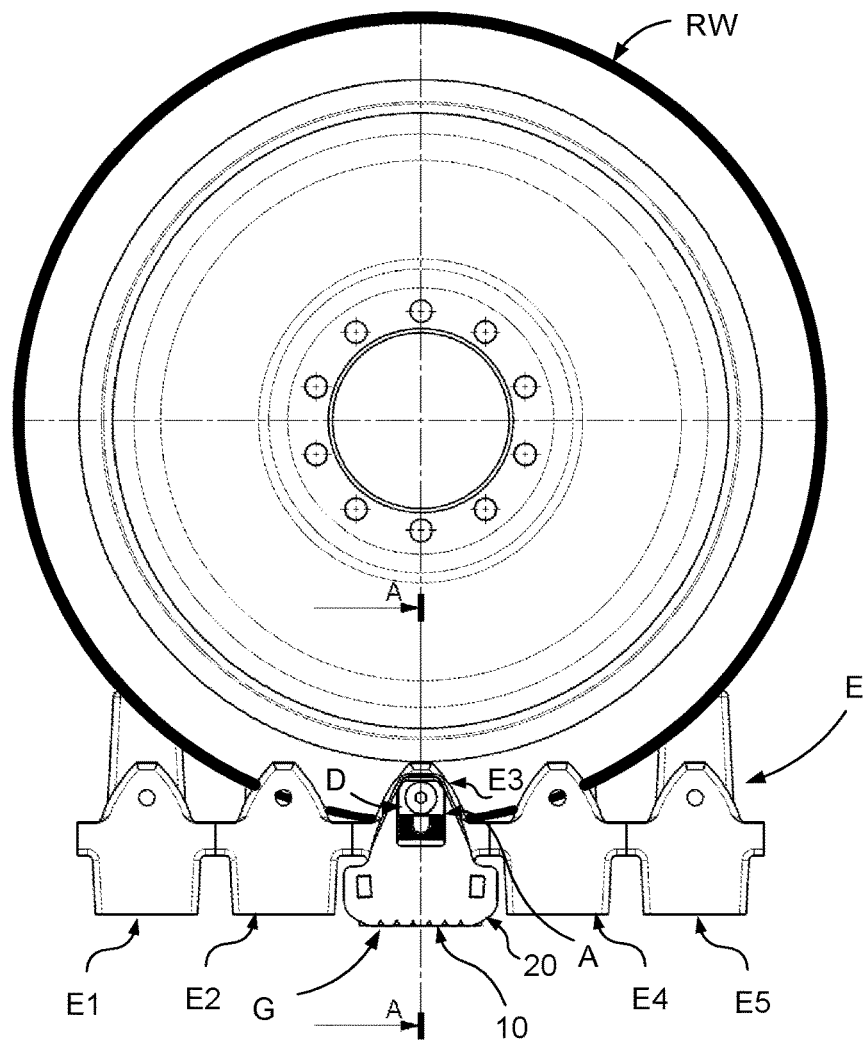
FIG. 2 schematically illustrates a side view of a portion of an endless track, a road wheel configured to be surrounded by the endless track, and a ground engaging device attached to the endless track according to an embodiment of the present disclosure.

FIG. 2 schematically illustrates a side view of a portion of an endless track E, a road wheel RW configured to be surrounded by the endless track E, i.e. arranged in connection to the inner side of said endless track E, and a ground engaging device G attached to the endless track according to an aspect of the present disclosure.

The endless track E comprises a set of interconnected transversal track sections, five such track sections E1, E2, E3, E4, E5 being illustrated in FIG. 2 showing a portion of the endless track.

The ground engaging device G is attached to the outer side of the endless track E in connection to such a track section E3 of the endless track E.

Figure 5:
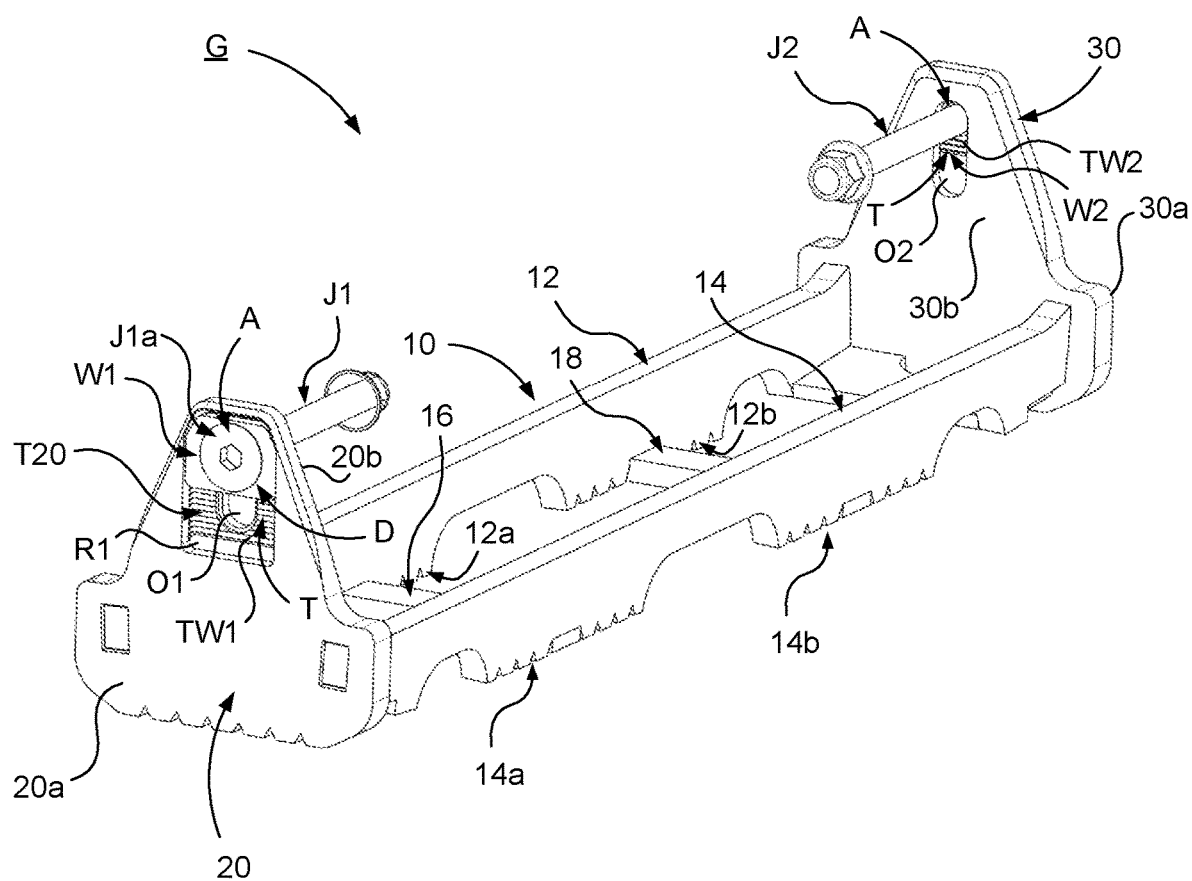
FIG. 5 schematically illustrates a perspective view of a ground engaging device according to an embodiment of the present disclosure.

The ground engaging device G comprises an engagement member 10 configured to be arranged on the outer side of the endless track E, see also e.g. FIG. 5. The engagement member 10 is supported by opposite side members, one side member 20 being illustrated in FIG. 2, see also e.g. FIG. 5.

The ground engaging device G comprises a fastening arrangement A for attaching the ground engaging device G to the endless track E so that the engagement member 10 is positioned in connection to the outer side of the endless track E. According to an aspect of the present disclosure, the fastening arrangement A is configured to attach the ground engaging device G to the endless track E with a certain tension. According to an aspect of the present disclosure, the fastening arrangement A is configured to attach the ground engaging device G to the endless track E so that the engagement member 10 is attached against the outer side of the endless track E with a certain tension. The fastening arrangement A comprises said side members, the side members being configured to be attached to the respective side of the endless track E, in FIG. 2 illustrated by the side member 20 being attached to a side of the track section E3 of the endless track E.

The portion of the endless track E in FIG. 2 is positioned such that the road wheel RW is positioned on the track section E3 and thus provides a pressure against the track section E3 of the endless track E, wherein the pressure is transferred to the ground engaging device G being in contact with the ground. The pressure is associated with the weight of the body of the tracked vehicle V.

The fastening arrangement A comprises an adjustment device D configured to allow self adjustment of the position of said engagement member 10 relative to the endless track based on pressure against the engagement member 10 towards the endless track E According to an aspect of the present disclosure, the adjustment device D is configured to allow self adjustment of the tension with which said engagement member 10 is attached to the endless track based on pressure against the engagement member 10 towards the endless track E.

The adjustment device D is configured to allow movement of the engagement member 10 and the side members in the direction towards the endless track E so that the position of the engagement member 10 is adjusted so that it is closer to the endless track E. The adjustment device D is configured to allow movement of the engagement member 10 and the side members in the direction towards the endless track E so that the tension provided by the fastening arrangement is increased.

The adjustment device D is further configured to prevent movement of the engagement member 10 and the side members in the opposite direction.

The ground engaging member 10 and the side members supporting the ground engaging member 10 provide a U-shaped unit. The adjustment device D is configured to allow movement of the U-shaped unit in the direction towards the endless track E so that the position of the U-shaped unit is adjusted so that the engagement member 10 is closer to the outer side Ea of the endless track E. The adjustment device D is configured to allow movement of the U-shaped unit in the direction towards the endless track E so that the tension provided by the fastening arrangement is increased. The adjustment device D is further configured to prevent movement of the engagement member 10 and the side members in the opposite direction.

Figure 6:
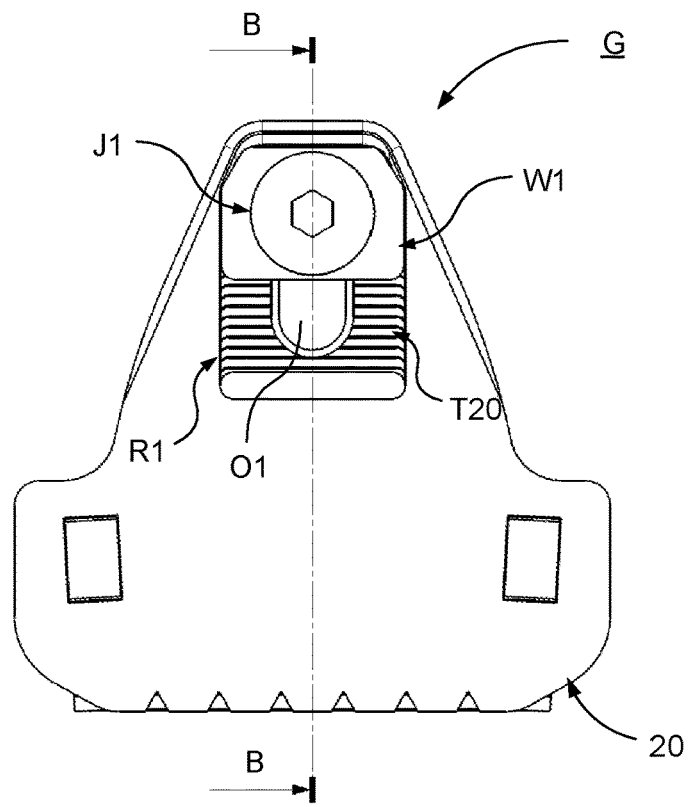
FIG. 6 schematically illustrates a side view of a the ground engaging device in FIG. 5, according to an embodiment of the present disclosure.
Figure 7:
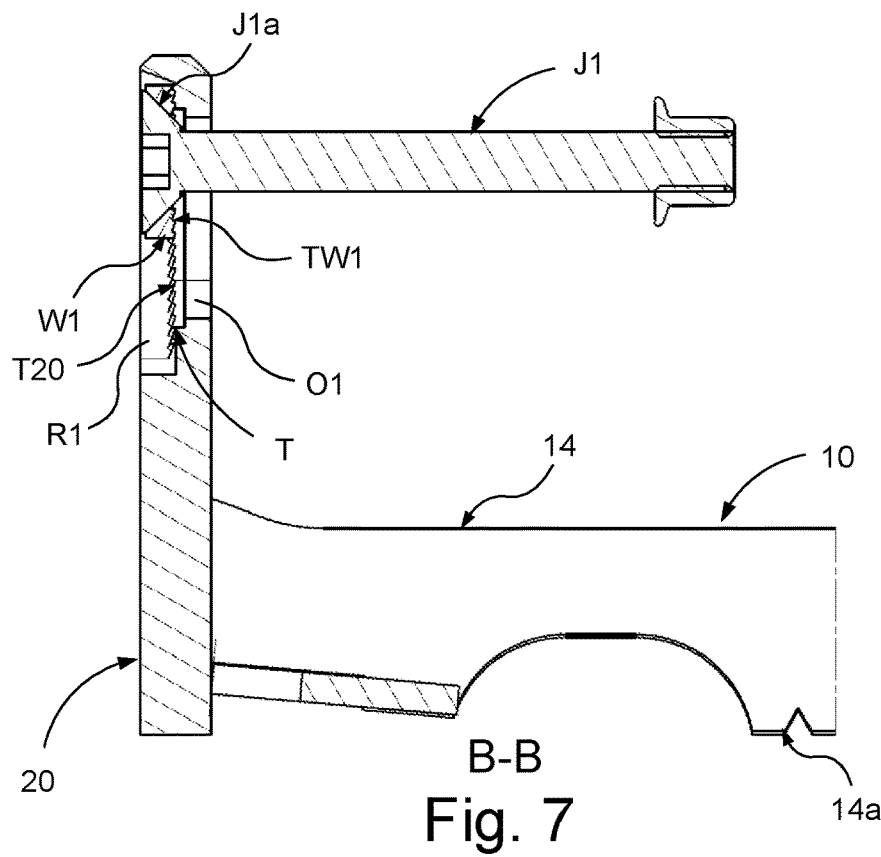
FIG. 7 schematically illustrates a cross sectional view of a portion of the ground engaging device in FIG. 6a according to an embodiment of the present disclosure.

The function and the adjustment device D is described in more detail with reference to FIG. 5-7.

Figure 3:
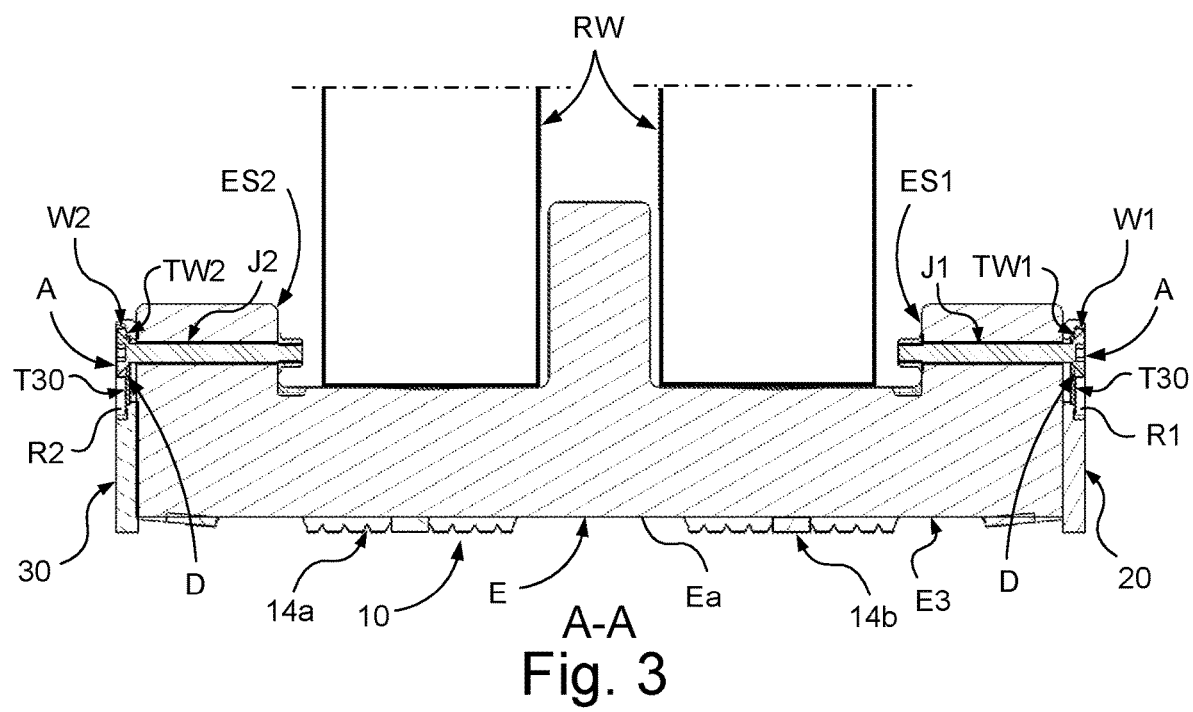
FIG. 3 schematically illustrates a cross sectional view of the track, a portion of the road wheel and the ground engaging device in FIG. 2, according to an embodiment of the present disclosure.
Figure 4:
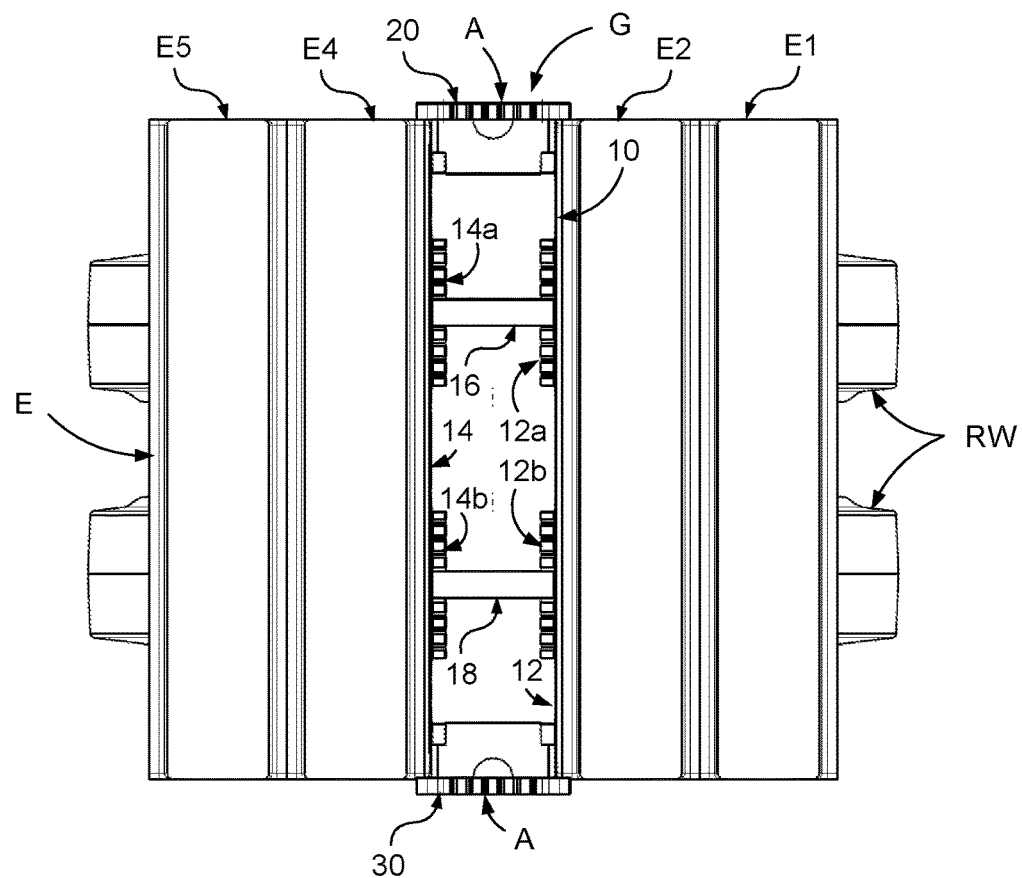
FIG. 4 schematically illustrates a plan view from underneath of the portion of an endless track, the road wheel, and a ground engaging device in FIG. 2, according to an embodiment of the present disclosure.

FIG. 3 schematically illustrates a cross sectional view A-A of the endless track E, a portion of the road wheel RW and the ground engaging device G in FIG. 2, according to an aspect of the present disclosure. FIG. 4 schematically illustrates a plan view from underneath of the portion of an endless track E, the road wheel RW, and a ground engaging device in FIG. 2, according to an aspect of the present disclosure. According to an aspect of the present disclosure said road wheel RW comprises a right road wheel member and a left road wheel member. Said right and left road wheel member of the respective road wheel RW are according to an aspect coaxially arranged relative to each other.

FIG. 5 schematically illustrates a perspective view of a ground engaging device according G to an embodiment of the present disclosure. FIG. 6 schematically illustrates a side view of a the ground engaging device G in FIG. 5, according to an embodiment of the present disclosure. FIG. 7 schematically illustrates a cross sectional view B-B of a portion of the ground engaging device G in FIG. 6a according to an embodiment of the present disclosure.

As illustrated in FIG. 5, the ground engaging device G comprises opposite side members 20, 30, a first side member 20 and an opposite second side member 30. As mentioned above the ground engaging member 10 is supported by the opposite side members 20, 30.

The ground engaging member 10 and the side members 20, 30 supporting the ground engaging member 10 thus provide a U-shaped unit 10, 20, 30 configured to be attached on the outer side of the endless track of a tracked vehicle so that the ground engaging member 10 engages with the ground on which the tracked vehicle is travelling, and the side members 20, 30 are connected to the respective side of the endless track.

The ground engaging member 10 and the side members 20, 30 supporting the ground engaging member 10 may be formed as a single unit. The ground engaging member 10 and the side members 20, 30 supporting the ground engaging member 10 may be formed such that the side member 20, 30 are attached to the respective side of the ground engaging member 10.

The respective side member 20, 30 has, according to an aspect of the present disclosure, an essentially orthogonal extension relative to the extension of the ground engaging member 10. The respective side member 20, 30 is, according to an aspect of the present disclosure, configured to extend essentially orthogonally from the ground engaging member 10 so as to provide opposite sides for facilitating attaching the ground engaging device G to the endless track of a tracked vehicle.

When attached to the outer side of the endless track E, the ground engaging member is configured to run transversely to the longitudinal extension of the endless track E on the outer side of the endless track E and the first side member 20 is configured to run on along one side of the endless track and the second side member 30 is configured to run on along opposite side of the endless track E.

As illustrated in FIG. 5, the respective side member 20, 30 comprises an elongated opening O1, O2 extending in a direction essentially orthogonal to the extension of the ground engaging member 10. Thus, the first side member 20 comprises a first elongated opening O1 and the second side member 30 comprises a second elongated member O2.

The respective elongated opening O1, O2 is arranged in the side member 20, 30 a distance from the level of the ground engaging member 10 so as to facilitate attaching the ground engaging device G to inwardly protruding opposite side members ES1, ES2 of the endless track E, i.e. inwardly protruding opposite side members of track sections of the endless track E. See FIG. 3. The first elongated opening O1 is arranged in the first side member 20. The second elongated opening O2 is arranged in the second side member 30.

As illustrated in e.g. FIGS. 4 and 5, the engagement member 10 comprises a pair of support beams 12, 14 configured to be connected between and support the side members 20, 30. The pair of support beams 12, 14 comprises a first support beam 12 and a second support beam 14, said support beams running essentially parallel relative to each other between the first and second side member 20, 30.

As illustrated in e.g. FIGS. 4 and 5, the engagement member 10 comprises a pair of transversal elements 16, 18 arranged between the support beams 12, 14 connecting the support beams 12, 14.

As illustrated in e.g. FIGS. 4 and 5, the engagement member 10 comprises grip elements 12a, 12b, 14a, 14b configured to improve ground engagement and hence improve traction of the tracked vehicle on ground conditions such as ice, snow, mud or the like.

The first support beam 12 comprises grip elements 12a, 12b. The second support beam 14 comprises grip element 14a, 14b.

According to aspect of the present disclosure, the ground engaging device G is configured to provide increased ground engagement so as to improve traction of the tracked vehicle on ground conditions such as ice, snow, mud or the like.

As illustrated in FIG. 3 and FIG. 5, said fastening arrangement A comprises a fastening joint member J1, J2 configured to be introduced into the respective elongated opening O1, O2. The fastening arrangement A thus comprises a first fastening joint member J1 configured to be introduced into the first elongated opening O1, and a second fastening joint member J2 configured to be introduced into the second elongated opening O2.

The first fastening joint member J1 comprises a first joint head J1a configured to provide a stop against the outer side of the first side member when the first fastening joint is introduced into the first elongated opening O1. The second fastening joint member J2 comprises a second joint head J2a configured to provide a stop against the outer side of the second side member when the second fastening joint is introduced into the second elongated opening O2.

As illustrated in FIG. 3, the first fastening joint member J1 is configured to provide an attachment of the first side member 20 to one side of the endless track E. As illustrated in FIG. 3, the first fastening joint member J1 is configured to provide an attachment of the first side member 20 to a first inwardly protruding side member ES1 of the endless track E. The first joint member J1 is according to an aspect a screw joint member.

As illustrated in FIG. 3, the second fastening joint member J2 is configured to provide an attachment of the second side member 30 to the opposite side of the endless track E. As illustrated in FIG. 3, the second fastening joint member J2 is configured to provide an attachment of the second side member 30 to a second inwardly protruding side member ES2 of the endless track E. The second joint member J2 is according to an aspect a screw joint member.

According to an aspect of present disclosure, the ground engaging device G is configured to be removably attachable to the endless track E of a track assembly of a tracked vehicle.

As illustrated in e.g. FIG. 5, the adjustment device D comprises a teeth locking configuration T configured to allow movement of the engagement member 10 and side members 20, 30 in the direction towards the endless track E, and configured to provide a locking function so as to prevent movement in the opposite direction.

As illustrated in e.g. FIGS. 3 and 5, the teeth locking configuration T of the adjustment device D comprises a set of teeth T20, T30, TW1, TW2 with an inclination so as to allow stepwise movement of the engagement member 10 and side member 20, 30 in the direction towards the endless track E. The set of teeth T20, T30, TW1, TW2 of the teeth locking configuration T is further configured to provide said locking function in the opposite direction.

Said elongated openings O1, O2 of the fastening arrangement A are configured to facilitate the movement of the side members 20, 30 and ground engaging member 10 relative to said fastening joint members J1, J2. Said elongated openings O1, O2 of the fastening arrangement A are configured to facilitate the movement of the U-shaped unit 10, 20, 30 of the ground engaging device G relative to said fastening joint members J1, J2.

The adjustment device D is arranged in the respective side member 20, 30.

According to an aspect of the present disclosure, for the respective side member 20, 30, said teeth locking configuration T is arranged in connection to the elongated opening O1, O2.

As illustrated e.g. in FIG. 5, the respective side member 20, 30 has an outer side 20a, 30a configured to face away from the endless track and the opposite side member.

The first side member 20 has an outer side 20a configured to face away from the ground engaging member 10. The first side member 20 has an outer side 20a configured to face away from the second side member 30. The first side member 20 has an inner side 20b opposite to the outer side 20a. The first side member 20 has an inner side 20b configured to face towards the ground engaging member 10. The first side member 20 has an inner side 20b configured to face toward the second side member 30.

The second side member 30 has an outer side 30a configured to face away from the ground engaging member 10. The second side member 30 has an outer side 30a configured to face away from the first side member 20. The second side member 30 has an inner side 30b opposite to the outer side 30a. The second side member 30 has an inner side 30b configured to face towards the ground engaging member 10. The second side member 30 has an inner side 30b configured to face toward the first side member 20.

According to an aspect of the present disclosure, said teeth locking configuration T comprises one or more teeth T20, T30 arranged on the outer side of the respective side member 20, 30. Said one or more teeth T20, T30 are, according to an aspect, configured to have an extension running essentially orthogonally to the longitudinal extension of the elongated member 10 and essentially orthogonally to the longitudinal extension of the elongated openings O1, O2.

The teeth locking configuration T comprises one or more teeth T20 arranged on the outer side of the first side member 20. According to an aspect, the teeth locking configuration T comprises a set of teeth T20 arranged on the outer side of the first side member 20.

The teeth locking configuration T comprises one or more teeth T30 arranged on the outer side of the second side member 30. According to an aspect, the teeth locking configuration T comprises a set of teeth T30 arranged on the outer side of the second side member 30.

According to an aspect of the present disclosure, the respective side member 20, 30 comprises a recess R1, R2 arranged on the outer side in connection to the elongated opening O1, O2, see e.g. FIGS. 3 and 5. According to an aspect of the present disclosure, the first side member 20 comprises a first recess R1 arranged on the outer side 20a in connection to the first elongated opening O1. According to an aspect of the present disclosure, the second side member 30 comprises a second recess R2 arranged on the outer side 30a in connection to the second elongated opening O2.

According to an aspect of the present disclosure, the first recess R1 has a bottom, wherein said first elongated opening is arranged in said bottom. According to an aspect of the present disclosure, the first recess R1 further has opposite sides, running along the longitudinal extension of the first elongated opening O1 on the respective side of said opening O1. According to an aspect of the present disclosure, the first recess R1 further has opposite sides, running essentially transversally to the longitudinal extension of the first elongated opening O1 on the respective side of said opening O1. According to an aspect of the present disclosure, the first recess R1 has an essentially rectangular shape with the long sides running along the long sides of the first longitudinal opening O1.

According to an aspect of the present disclosure, the second recess R2 has a bottom, wherein said second elongated opening is arranged in said bottom. According to an aspect of the present disclosure, the second recess R2 further has opposite sides, running along the longitudinal extension of the second elongated opening O2 on the respective side of said opening O2. According to an aspect of the present disclosure, the second recess R2 further has opposite sides, running essentially transversally to the longitudinal extension of the second elongated opening O2 on the respective side of said opening O2. According to an aspect of the present disclosure, the second recess R2 has an essentially rectangular shape with the long sides running along the long sides of the second longitudinal opening O2.

According to an aspect of the present disclosure, for the respective side member 20, 30, one or more teeth T20, T30 of said teeth locking configuration are arranged in the bottom of said recess R1, R2. Said one or more teeth T20, T30 are, according to an aspect, configured to have an extension running essentially orthogonally to the longitudinal extension of the elongated member 10 and essentially orthogonally to the longitudinal extension of the elongated openings O1, O2. See FIGS. 3 and 5.

According to an aspect of the present disclosure, the teeth locking configuration T comprises one or more teeth T20 arranged in the bottom of the first recess R1 of the first side member 20. According to an aspect, the teeth locking configuration T comprises a set of teeth T20 arranged in the bottom of the first recess R1 of the first side member 20. See FIGS. 3 and 5.

According to an aspect of the present disclosure, the teeth locking configuration T comprises one or more teeth T30 arranged in the bottom of the second recess R2 of the second side member 30. According to an aspect, the teeth locking configuration T comprises a set of teeth T30 arranged in the bottom of the second recess R2 of the second side member 30. See FIGS. 3 and 5.

According to an aspect of the present disclosure, said fastening arrangement A comprises, for the respective side member 20, 30, a washer element W1, W2 configured to distribute the load of the fastening joint member. See FIGS. 3 and 5.

According to an aspect of the present disclosure, said fastening arrangement A comprises a first washer element W1 for the first side member 20. According to an aspect of the present disclosure, said fastening arrangement A comprises a first washer element W1 for the first fastening joint member J1 for facilitating fastening in connection to the first side member 20. See FIGS. 3 and 5. The first washer element W1 is configured to be arranged between the first head J1a of the first fastening joint J1 and the outer side 20a with one or more teeth T20, e.g. the bottom of the first recess R1, so as to facilitate attachment of by means of the first fastening joint member J1 and the tension adjustment.

According to an aspect of the present disclosure, said fastening arrangement A comprises a second washer element W2 for the second side member 30. According to an aspect of the present disclosure, said fastening arrangement A comprises a second washer element W2 for the second fastening joint member J2 for facilitating fastening in connection to the second side member 30. See FIGS. 3 and 5. The second washer element W1 is configured to be arranged between the second head J2a of the second fastening joint J2 and the outer side 30a with one or more teeth T30, e.g. the bottom of the second recess R2, so as to facilitate attachment of by means of the second fastening joint member J2 and the tension adjustment.

According to an aspect of the present disclosure, teeth locking configuration T comprises one or more teeth TW1, TW2 arranged on the washer element W1, W2. The one or more teeth TW1, TW2 arranged on the washer element W1, W2 are configured to engage with the one or more teeth of the side member.

According to an aspect of the present disclosure, the teeth locking configuration T comprises one or more teeth TW1 arranged on the first washer element W1. According to an aspect, the teeth locking configuration T comprises a set of teeth TW1 arranged on the first washer element W1. See FIG. 3.

According to an aspect of the present disclosure, the teeth locking configuration T comprises one or more teeth TW2 arranged on the second washer element W2. According to an aspect, the teeth locking configuration T comprises a set of teeth TW2 arranged on the second washer element W2. See FIG. 3.

According to an aspect of the present disclosure, said washer element W1, W2, for the respective side member 20, 30, is configured to be closely received within said recess R1, R2 so as to maintain said one or more teeth TW1, TW2 of the washer element W1, W2 aligned with the one or more teeth T20, T30 of the side member 20, 30.

According to an aspect of the present disclosure, said first washer element W1 for the first side member 20 and first fastening joint member J1 is configured to be closely received within the first recess R1 so as to maintain said one or more teeth TW1 of the first washer element W1 aligned with the one or more teeth T20 of the first side member 20.

According to an aspect of the present disclosure, said second washer element W2 for the second side member 30 and second fastening joint member J2 is configured to be closely received within the second recess R2 so as to maintain said one or more teeth TW2 of the second washer element W2 aligned with the one or more teeth T30 of the second side member 30.

The respective washer element W1, W2 is shaped so as to fit into the respective recess R1, R2 so as to facilitate efficient control of movement of the washer element W1, W2 and efficient positioning of the washer element W1, W2 within the recess R1, R2 so as to efficiently reduce the risk of the washer element W1, W2 turning and thereby the risk of the one or more teeth of the washer element not engaging with the one or more teeth of the side member due to said teeth not aligning.

The respective washer element W1, W2 is configured to be arranged within the respective recess R1, R2 such that the washer element W1, W2 extends so that opposite sides of the washer element are close to said opposite sides of the recess, essentially preventing turning of the washer element W1, W2 but allowing the washer element to move relative to the elongated opening O1, O2.

According to an aspect of the present disclosure, the first washer element W1 is configured to be arranged within the first recess R1 such that the washer element W1 extends so that opposite sides of the washer element are close to said opposite sides of the first recess running along the long side of the first elongated opening O1, essentially preventing turning of the first washer element W1 but allowing the washer element to move relative to the first elongated opening O1 within the first recess R1.

According to an aspect of the present disclosure, the second washer element W2 is configured to be arranged within the second recess R2 such that the washer element W2 extends so that opposite sides of the washer element are close to said opposite sides of the second recess running along the long side of the second elongated opening O2, essentially preventing turning of the second washer element W2 but allowing the washer element to move relative to the second elongated opening O2 within the second recess R2.

Above with reference to e.g. FIGS. 3, 5, 6 and 7, an aspect of the present disclosure has been described, where the teeth locking configuration comprises one or more teeth, here a set of teeth, arranged on the outer side of the respective side member. Further, with reference to e.g. FIGS. 3, 5, 6 and 7, a washer element for the joint member of the respective side member is provided with one or more teeth of the teeth locking configuration. The respective washer element is arranged on the outer side of the respective side member in connection to the elongated opening, and hence between the joint head of the joint member and outer side of the side member, so that the one or more teeth of the washer faces and engages with the one or more teeth on the outer side of the respective side member.

According to an alternative aspect of the present disclosure, not shown, the teeth locking configuration comprises one or more teeth, e.g. a set of teeth, arranged on the inner side of the respective side member. Further, according to the alternative aspect of the present disclosure, a washer element for a joint member of the respective side member is provided with one or more teeth of the teeth locking configuration. The respective washer element is according to this alternative aspect arranged on the inner side of the respective side member in connection to the elongated opening, and hence between the joint head of the joint member and the side of the endless track, so that the one or more teeth of the washer faces and engages with the one or more teeth on the outer side of the respective side member. This alternative aspect of the present disclosure essentially differs from the aspect illustrated in e.g. FIGS. 3, 5, 6 and 7 in that the one or more teeth, e.g. set of teeth, of the tooth locking configuration are arranged on the inner side of the respective side member, and that engagement with corresponding teeth, e.g. of washer elements, is provided.

Above with reference to e.g. FIGS. 3, 5, 6 and 7, an aspect of the present disclosure has been described, where the respective side member comprises a recess R1, R2 arranged on the outer side in connection to the elongated opening, wherein one or more teeth of the teeth locking configuration are arranged in the bottom of said recess. Further, with reference to e.g. FIGS. 3, 5, 6 and 7, a washer element for the joint member of the respective side member is provided with one or more teeth of the teeth locking configuration. The respective washer element is arranged in the bottom of the recess of the respective side member in connection to the elongated opening, and hence between the joint head of the joint member and bottom of the recess, so that the one or more teeth of the washer faces and engages with the one or more teeth on the bottom of the recess.

According to an alternative aspect of the present disclosure, not shown, the respective side member comprises a recess arranged on the inner side of the respective side member in connection to the elongated opening, wherein one or more teeth of the teeth locking configuration are arranged in the bottom of said recess. Further, according to the alternative aspect of the present disclosure, a washer element for a joint member of the respective side member is provided with one or more teeth of the teeth locking configuration. The respective washer element is arranged in the bottom of the recess of the respective side member in connection to the elongated opening, and hence between the side of the endless track and the bottom of the recess, so that the one or more teeth of the washer faces and engages with the one or more teeth on the bottom of the recess. This alternative aspect of the present disclosure essentially differs from the aspect illustrated in e.g. FIGS. 3, 5, 6 and 7 in that the one or more teeth, e.g. set of teeth, of the tooth locking configuration are arranged on the inner side of the respective side member on the bottom of a recess arranged on the inner side of the respective side member.

The ground engaging device as describe above with reference to FIG. 2-7 is configured to provide increased ground engagement so as to improve traction of the tracked vehicle on ground conditions such as ice and snow. The ground engaging device according to the present disclosure may be any suitable ground engaging device comprising a adjustment device configured to allow self adjustment of the tension with which the engagement member of the ground engaging device is attached to the endless track based on pressure against the engagement member towards the endless track. The ground engaging device according to the present disclosure may according to an alternative aspect of the present disclosure be configured to provide a more silent drive when engaging with the ground during drive of the tracked vehicle provided with ground engaging devices.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. A ground engaging device for an endless track of a tracked vehicle, the ground engaging device being attachable to the outer side of said endless track, the ground engaging device comprising an engagement member configured to be arranged on the outer side of the endless track, and a fastening arrangement for attaching the ground engaging device to the endless track so that the engagement member is positioned in connection to the outer side of the endless track, wherein the fastening arrangement comprises an adjustment device configured to:
    allow adjustment of the position of said engagement member relative to the endless track based on pressure against the engagement member towards the endless track;
    allow movement of the engagement member in a direction towards the endless track so that tension provided by the fastening arrangement is increased; and
    prevent movement of the engagement member in the opposite direction so that the increased tension by the movement is maintained by the adjustment device.

2. The ground engaging device according to claim 1, wherein the adjustment device is configured to allow adjustment of the tension with which the ground engaging device is attached to the endless track.

3. The ground engaging device according to claim 1, wherein the adjustment device comprises a teeth locking configuration configured to allow movement of the engagement member in the direction towards the endless track, and configured to provide a locking function so as to prevent movement in the opposite direction.

4. The ground engaging device according to claim 3, wherein the teeth locking configuration comprises a set of teeth with an inclination so as to allow stepwise movement of the engagement member in the direction towards the endless track, and provide said locking function in the opposite direction.

5. The ground engaging device according to claim 3, wherein said fastening arrangement comprises opposite side members for fastening the ground engaging device on the respective side of the endless track, the ground engaging member being arranged between the side members, wherein the side members are configured to support said ground engaging member, the adjustment device being associated with the respective side member.

6. The ground engaging device according to claim 5, wherein the respective side member comprises an elongated opening extending in a direction essentially orthogonal to the extension of the ground engaging member, said fastening arrangement comprising a fastening joint member configured to be introduced into the respective elongated opening, said elongated openings facilitating movement of the side members and hence ground engaging member relative to said fastening joint members.

7. The ground engaging device according to claim 6, wherein, for the respective side member, said teeth locking configuration is arranged in connection to the elongated opening.

8. The ground engaging device according to claim 6, wherein the respective side member has an outer side configured to face away from the endless track and an opposite inner side configured to face towards the endless track, wherein said teeth locking configuration comprises one or more teeth arranged on at least one side of the respective side member.

9. The ground engaging device according to claim 8, wherein the respective side member comprises a recess arranged on one side of the side member in connection to the elongated opening, wherein, for the respective side member, one or more teeth of said teeth locking configuration are arranged in the bottom of said recess.

10. The ground engaging device according to claim 8, wherein said fastening arrangement comprises, for the respective side member, a washer element configured to distribute the load of the fastening joint member, wherein said teeth locking configuration comprises one or more teeth arranged on the washer element and configured to engage with the one or more teeth of the side member.

11. The ground engaging device according to claim 10, wherein said washer element, for the respective side member, is configured to be closely received within said recess so as to maintain said one or more teeth of the washer element aligned with the one or more teeth of the side member.

12. The ground engaging device according to claim 1, wherein said ground engaging device is configured to provide increased ground engagement so as to improve traction of the tracked vehicle on ground conditions such as ice and snow.

13. The ground engaging device according to claim 1, wherein the ground engaging device is removably attachable to the endless track of a track assembly of a tracked vehicle.

14. The tracked vehicle comprising at least one ground engaging device according to claim 1.

* * * * *